United States Patent [19]

Lo

[11] Patent Number: 4,630,913
[45] Date of Patent: Dec. 23, 1986

[54] EXTENDED DEPTH-OF-FIELD 3-D CAMERA

[76] Inventor: Allen K. W. Lo, 5022 Hidden Branches Dr., Dunwoody, Ga. 30338

[21] Appl. No.: 809,598

[22] Filed: Dec. 16, 1985

[51] Int. Cl.$^4$ .............................................. G03B 35/10
[52] U.S. Cl. ........................................ 354/115; 352/60
[58] Field of Search ............... 354/112, 114, 115, 116; 352/60, 62, 65, 239, 58; 355/22

[56] References Cited

U.S. PATENT DOCUMENTS

| | | | |
|---|---|---|---|
| 2,434,385 | 1/1948 | Bonnet | 354/115 |
| 2,492,836 | 12/1949 | Bonnet | 354/115 |
| 2,627,201 | 2/1953 | Baker | 354/115 |
| 2,834,270 | 5/1958 | Williams | 352/60 |
| 3,363,966 | 1/1968 | Hoch | 354/115 |
| 3,521,947 | 7/1970 | Jones | 354/115 |
| 3,535,993 | 10/1970 | Jones | 354/115 |
| 4,037,950 | 7/1977 | Lo et al. | 352/58 |
| 4,086,585 | 4/1978 | Lo et al. | 354/114 |
| 4,126,876 | 11/1978 | Jones | 354/112 |
| 4,436,369 | 3/1984 | Bukowski | 354/114 |

Primary Examiner—A. A. Mathews

[57] ABSTRACT

In the three dimensional camera of this invention, reflective surfaces, such as a prism or mirrors, are placed between each lens and its negative holder with the reflective surfaces at an angle of approximately 45° to the center of the lens. This results in the image center of each camera lens being offset from the center of the lens to gain more space for a larger image format to reduce the parallax effect of foreground and background object images between each adjacent image.

7 Claims, 3 Drawing Figures

EXTENDED DEPTH-OF-FIELD 3-D CAMERA

BACKGROUND OF THE INVENTION

In indirect lenticulated three dimensional (3D) photography, it is necessary to record simultaneously images of the original scene taken from plural points of observation. A plurality of two-dimensional views of a scene or object field are taken from a number of horizontally spaced vantage points and later combined beneath a lenticular screen to form a composite three-dimensional view of the field.

In the past, the image planes of a multi-lens (more than 2) 3D camera have always been positioned directly at the center behind each lens. Typically, the camera lenses are placed relatively close together (equal to the width of the negative) to avoid excessive parallax. Parallax is the apparent shift in position of an element of an object field due to the relative change in position of the element and the place from which the element is viewed. Excessive parallax creates a greater shift of object image in the 2D images taken from different viewpoints and causes the images of foreground and background objects in the 3D photograph to be out-of-focus and appear blurred, since the eyes cannot fuse the two images together to form a single solid 3D image.

Placing the camera lenses close together cannot reduce the parallax effect as the width of the negative must also be reduced because the negative is positioned immediately behind the center of each lens and the width of each negative is limited by the center-to-center separation of adjacent lenses. Enlarging the negative will simply remagnify the parallax effect between adjacent negatives.

PRIOR ART

U.S. Pat. No. 3,363,966 (Hoch) discloses the use of prisms to direct right- and left-view images of a scene being photographed to a pair of apertures. The prism is located in front of the lens. U.S. Pat. No. 4,436,369 (Bukowski) shows the use of mirrors between two sets of lenses in a movie camera for focusing left and right images onto motion picture half-frames of film in the correct alignment. The mirrors are located between two sets of lenses.

U.S. Pat. No. 2,434,385 (Bonnet) shows the placement of a prism in front of several lenses in different planes at their optical intersection in order to refract an image to photographic plates behind the lenses. The plates are in different planes and the prism is located between the lenses and object to be photographed.

U.S. Pat. No. 2,492,836 (Bonnet) uses mirrors in front of the lenses to project images onto plates in different planes.

U.S. Pat. No. 4,126,876 (Jones) shows a camera which uses a mirror to reverse the image. Of interest are U.S. Pat. Nos. 4,086,585 and 4,037,950 (Lo).

SUMMARY OF THE INVENTION

It is an object of this invention to reduce the parallax effect of a multi-lens 3D camera. A further object is to develop a technique so that the image size (image format or negative size) in the 3D camera can be larger than the spacing between the center-to-center spacing of adjacent lenses to reduce the parallax effect of images of foreground and background objects created by each adjacent pair of lenses to increase the depth of field of the camera for sharper and in-focus 3D photographs.

These objects are met by optically offsetting the center of the image plane above, below or to the side of the optical axis of each lens by mirrors or prisms to increase the horizontal space for each image (negative) up to 200% (i.e., that the width of the image will be twice the width of the spacing from the center-to-center distance between adjacent lenses).

DETAILED DESCRIPTION OF THE DRAWINGS

Figure 1:
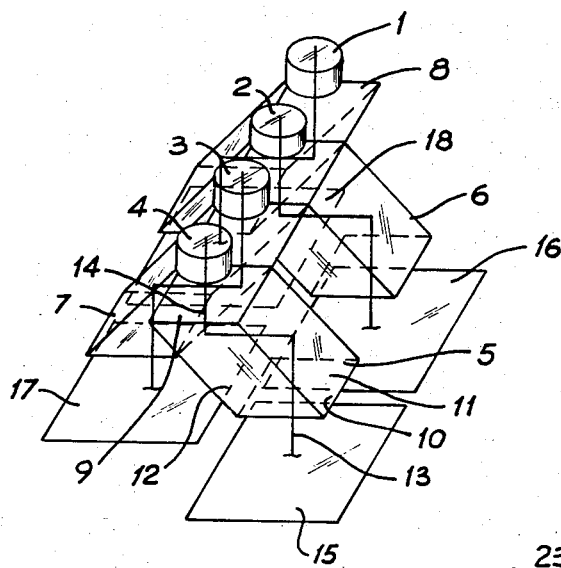
FIG. 1 is a schematic view of the prism section of the 3-D camera.

The 3-D camera shown in FIG. 1 has four lenses 1–4 arranged in a straight line. A prism 5–8 is located behind each lens. The ends 9,10 of each prism are transparent while the sides 11,12 have a surface reflective towards the interior of the prism. The image 13 is transmitted through the lens 4 to the reflective surface on side 12 where it is reflected to side 11. Sides 11,12 are located in planes parallel to each other. The prism is placed so that the sides 11,12 are at approximately a 45° angle to the axis (or center) 14 of the lens. This is necessary so the image is focused onto the negative (image format) 15 at a 90° angle to the plane of the negative 15. The negative holders and the negatives are located in a plane parallel to the plane of the lenses. The negatives 15–18 are optically offset vertically in an alternative arrangement in relation to the axis of each lens. This is necessary to permit the width of the negatives to be wider than the width between the lenses' centers. Negatives 15,16 are offset vertically to the right side of the camera while negatives 17,18 are offset to the left side of the camera.

Figure 2:
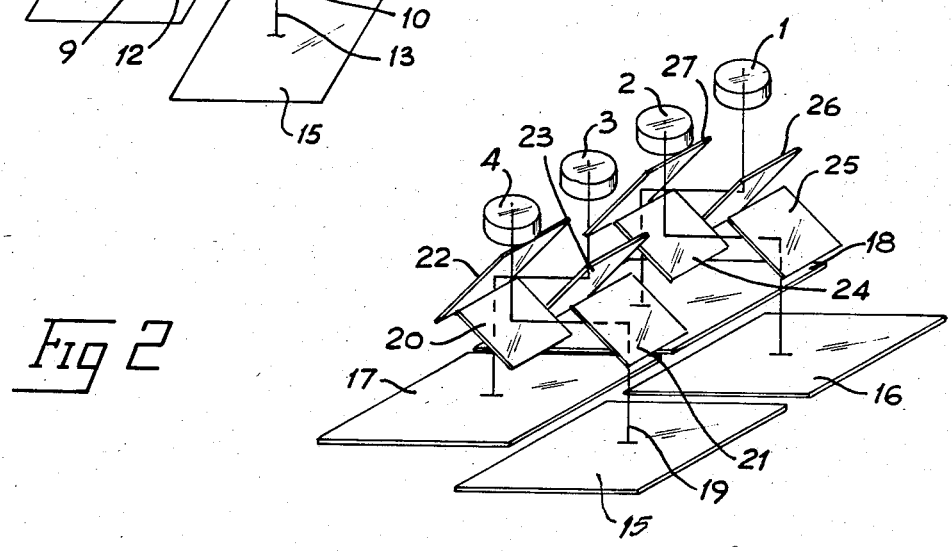
FIG. 2 is a schematic view of the mirror section of the 3-D camera.
Figure 3:
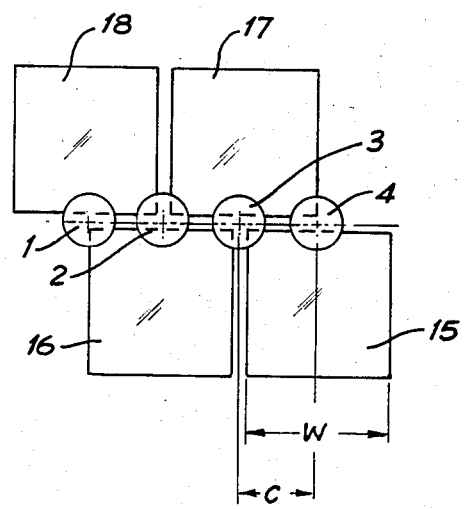
FIG. 3 is a top view of the negatives in the 3-D camera.

FIG. 3 shows the placement of the negatives 15–18 in relation to the lenses 1–4 for both the cameras shown in FIG. 1 and FIG. 2. The images from lenses 2,4 are projected onto negatives 16,15 respectively. The images from lenses 1,3 are projected onto negatives 18,17 respectively. The vertical offset of the negatives in relation to the axis of each lens are clearly shown in this drawing. The vertical offsetting of the negative (format) permits the width (W) of the negative (FIG. 3) to be up to twice the distance between the centers of adjacent lenses (C).

FIG. 2 shows a 3-D camera with mirrors for permitting the negatives to be offset. The image 19 is transmitted from lens 4 to negative 15. The images from lenses 3,2,1 are transmitted onto negatives 17,16,18 respectively. Image 19 is transmitted onto mirror 20 and reflected to mirror 21 and then onto the negative 15. Mirror 20 is tilted 45° toward the axis of the lens and mirror 21 is tilted 45° away from the axis of the lens. These mirrors are in parallel planes to each other. The other mirrors are arranged in a similar fashion.

The image format can also be increased to a size greater than the center-to-center distance between adjacent lenses by optically offsetting to the side of the lens. For example, in FIG. 1 negative holder 15 could be offset to the side of lens 4 and prism 5 turned on its vertical axis to focus the image onto negative holder 15. Prism 8 and negative holder 18 would likewise be changed. This would permit negative holders 16 and 17 (which remain vertically offset) to be increased in width as well as shifted negative holders 15 and 18. Normally, the image from the two end lenses (1 and 4) would be offset to the side.

The vertical optical offset with prisms is the preferred embodiment.

The reflective surfaces of the mirrors and prisms must be highly reflective and have uniform surfaces so the images are not distorted. The reflective surfaces can be a silvered mirror surface. The other parts of the 3-D camera are not shown, but they are of conventional construction.

A single mirror may be used to reflect the image onto a negative in a plane perpendicular to the lens with the negative offset from the lens.

Offsetting the negative reduces the parallax effect of a multi-lens 3D camera. This occurs because the image size is from 1.1 to 2 times the center-to-center lens spacing of adjacent lenses.

Once the pictures are taken by this camera, the two-dimensional images from each scene are combined together beneath a lenticular screen to form a composite three-dimensional view of the field.

I claim:

1. In a three dimensional camera for taking three dimensional pictures:
   (a) a plurality of lenses with a negative holder for each lens, with each negative holder being optically offset from the axis of the respective lens, with alternate negative holders being offset from each other;
   (b) at least one reflective element placed between each lens and its respective negative holder, with each element having at least one reflective surface arranged in a position so that each reflective surface is at an angle of approximately 45° to the image transmitted from the lens so that the images transmitted through each lens are reflected by the reflective elements onto the respective negative holders.

2. The camera of claim 1 in which
   (a) each lens and its negative holder are arranged in parallel planes, with each negative holder being offset vertically from the point of intersection of the axis of the respective lens into the plane of the negative holder;
   (b) and there is a single reflective element for each lens with two reflective surfaces with each reflective surface being at an angle of approximately 45° to the axis of the lens.

3. The camera of claim 2 in which the width of the negative holder is from 1.1 to 2 times the distance between the centers between adjacent lenses.

4. The camera of claim 2 in which (b) the reflective surfaces are mirrors.

5. The camera of claim 2 in which (b) the reflective element is a prism.

6. The camera of claim 1 in which
   (a) each lens and its respective negative holder are arranged perpendicular to each other, with each negative holder being optically offset from its respective lens; and
   (b) there being one reflective element for each lens with a single reflective surface for each element being arranged at an angle of approximately 45° to the image transmitted from the lens so the image is focused onto the respective negative holder.

7. The camera of claim 1 in which
   (a) each lens and its negative holder are arranged in parallel planes, with the negative holder for each end lens being offset to the side of such lens and each negative holder for the other lenses being offset vertically, each such offset being from the point of intersection of the axis of the respective lens into the plane of the negative holder;
   (b) and there is a single reflective element for each lens with two reflective surfaces with each reflective surface being at an angle of approximately 45° to the axis of the lens.

* * * * *